US00RE44985E

(19) United States
(12) Reissued Patent
Lipetz

(10) Patent Number: US RE44,985 E
(45) Date of Reissued Patent: Jul. 1, 2014

(54) OFF-ICE EDGE TRAINER AND METHOD

(71) Applicant: David I. Lipetz, Roslyn, NY (US)

(72) Inventor: David I. Lipetz, Roslyn, NY (US)

(21) Appl. No.: 13/774,339

(22) Filed: Feb. 22, 2013

Related U.S. Patent Documents

Reissue of:
(64) Patent No.: 8,118,599
Issued: Feb. 21, 2012
Appl. No.: 12/476,637
Filed: Jun. 2, 2009

U.S. Applications:
(60) Provisional application No. 61/059,933, filed on Jun. 9, 2008.

(51) Int. Cl.
*G09B 19/00* (2006.01)

(52) U.S. Cl.
USPC ..... 434/255

(58) Field of Classification Search
USPC ..... 434/247, 253, 255; 482/51, 52, 142, 482/145, 148
See application file for complete search history.

(56) References Cited

U.S. PATENT DOCUMENTS

| | | | |
|---|---|---|---|
| 3,915,457 | A | 10/1975 | Casey |
| 4,483,531 | A | 11/1984 | Laseman et al. |
| 4,730,826 | A | 3/1988 | Sudmeier |
| 4,824,100 | A | 4/1989 | Hall et al. |
| 5,593,370 | A | 1/1997 | Meldeau |
| 6,162,061 | A | 12/2000 | Taylor |
| 6,228,005 | B1 | 5/2001 | Gray |
| 6,569,041 | B1 | 5/2003 | Riivald |
| 7,104,901 | B1 | 9/2006 | Mason |
| 7,470,219 | B2 | 12/2008 | Larson |
| 7,645,221 | B1 | 1/2010 | Curry |
| 2004/0142759 | A1 | 7/2004 | Gianfagna et al. |
| 2005/0148449 | A1 | 7/2005 | Weir et al. |
| 2009/0111669 | A1 | 4/2009 | Richter |
| 2009/0291807 | A1 | 11/2009 | Moring, Jr. et al. |

FOREIGN PATENT DOCUMENTS

| | | |
|---|---|---|
| CA | 2668466 | 12/2009 |

OTHER PUBLICATIONS

CIPO Examiner's Report dated May 4, 2011 in Canadian Patent Application No. 2,668,466; 4 pages.
Response dated Oct. 5, 2011 in Canadian Patent Application No. 2,668,466; 12 pages.
CIPO Examiner's Report dated Apr. 10, 2012 in Canadian Patent Application No. 2,668,466; 2 pages.
Response dated Oct. 9, 2012 in Canadian Patent Application No. 2,668,466; 11 pages.
Albert et al., "Takeoff Characteristics of Single and Double Axel Figure Skating Jumps," JAB, 12(1), Feb. 1996, Abstract (1 page).
King et al., "A Kinematic Comparison of Single, Double, and Triple Axels", JAB, 10(1), Feb. 1994, Abstract (1 page).
Ireland et al., "Hip strength in females with and without patellofemoral pain," *J. Orthop. Sports. Phys. Ther.*, vol. 33, Issue 11, Nov. 2003, one page abstract.
Mascal et al., "Management of patellofemoral pain targeting hip, pelvis, and trunk muscle function: 2 case reports," *J. Orthop. Sports. Phys. Ther.*, vol. 33, Issue 11, Nov. 2003, one page abstract.
Powers, "The influence of altered lower-extremity kinematics on patellofemoral joint dysfunction: a theoretical perspective," *J. Orthop. Sports. Phys. Ther.*, vol. 33, Issue 11, Nov. 2003, one page abstract.
Ward et al., "The Influence of Medial Femoral Rotation on Lateral Patellar Tilt During Weightbearing and Non-Weightbearing Movements," *Medicine & Science in Sports & Exercise,* vol. 34, Issue 5, May 2002, one page abstract.

*Primary Examiner* — Kurt Fernstrom
(74) *Attorney, Agent, or Firm* — Andrew M. Calderon; Roberts Mlotkowski Safran & Cole, P.C.

(57) ABSTRACT

An off-ice edge trainer includes a platform having at least one substantially planar surface that is arranged at a first angle relative to horizontal and at a second angle relative to the horizontal. The first angle and the second angle are greater than 0°. The first angle is configured to cause a user standing on the at least one substantially planar surface of the ice-skating training system to shift their weight to a predetermined portion of a skate blade.

23 Claims, 4 Drawing Sheets

OFF-ICE EDGE TRAINER AND METHOD

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority under 35 U.S.C. §119 to U.S. Provisional Application No. 61/059,933 filed on Jun. 9, 2008, the contents of which are incorporated herein by reference in their entirety.

BACKGROUND OF THE INVENTION

1. Field of the Invention

The invention relates generally to a training apparatus and method, and more specifically to an off-ice training aid for skaters that is configured to strengthen the appropriate musculature and balance aspects associated with skating edge techniques.

2. Discussion of Background Information

Ice skaters utilize muscles throughout their entire body when skating on the ice. Muscles associated with the ankles, knees, pelvic girdle, and core stabilizers are particularly significant for maintaining proper body position when skating. These muscles are commonly exercised in isolation in an off-ice environment. However, conventional exercises typically only exercise a single muscle in a generic motion (e.g., typically a motion that isolates a single muscle), and such conventional exercises do not accurately reflect the complex interaction of numerous muscles that a skater utilizes when actually skating (e.g., on-ice).

Moreover, conventional off-ice exercises are normally performed without wearing skates. For example, a skater typically performs muscle-strengthening exercises while sitting or laying on a bench or the floor, or while standing in shoes (e.g., tennis shoes, running shoes, etc.). However, exercises that are performed without wearing skates do not accurately reflect the complex interaction of muscles and centers for balance that a skater utilizes when balancing on the narrow blade of a skate.

Accordingly, there exists a need in the art to overcome the deficiencies and limitations described hereinabove.

SUMMARY OF THE INVENTION

Exemplary embodiments and advantages of the present invention may be ascertained by reviewing the present disclosure and the accompanying drawing. In accordance with a first aspect of the invention, there is an ice-skating training system that includes a platform comprising at least one substantially planar surface that is arranged at a first angle relative to horizontal and at a second angle relative to the horizontal. The first angle and the second angle are greater than 0°. Moreover, the first angle is configured to cause a user standing on the at least one substantially planar surface of the ice-skating training system to shift their weight to a predetermined portion of a skate blade.

In embodiments, the second angle is different from the first angle. The at least one substantially planar surface may comprise a first substantially planar surface and a second substantially planar surface. The first and second substantially planar surfaces may be arranged on opposite lateral sides of the platform. The system may further include a third surface centrally located between the first and second substantially planar surfaces. The third surface may be substantially planar and is arranged at the second angle relative to the horizontal.

In embodiments, there is a rubber-like material arranged on at least one of the two angled surfaces and the third surface. The system may also include at least one stability pole that a user grasps to assist in maintaining their balance while standing on the platform. The system may also include at least one insert placed under the platform to modify one of the first angle and the second angle.

In embodiments, the system further comprises at least one of a structure and an indicia arranged in a base supporting the platform that indicates proper alignment of a skate blade in relation to the at least one angled surface.

The second angle may comprise a pitch associated with a length of the platform and is configured to cause a user standing on the platform to shift their weight forward or backward. In embodiments, the first angle and the second angle are configured to cause a user standing on the at least one substantially planar surface to shift their weight to an edge position selected from one of: right forward inside (RFI); right back inside (RBI); right forward outside (RFO); right back outside (RBO); left forward inside (LFI); left back inside (LBI); left forward outside (LFO); and left back outside (LBO).

In accordance with a second aspect of the invention, there is a method of at least one training and exercising, the method comprising: instructing a person to stand on an angled surface of a platform, and instructing the person to move at least one body part while maintaining their balance on the angled surface. The angled surface is substantially planar and a plane containing the angled surface is arranged at a first non-zero angle relative to horizontal and at a second non-zero angle relative to horizontal.

The method may further comprise instructing the person to view themselves in a mirror while they move the at least one body part.

The method may further comprise instructing the person to grasp at least one stability pole to assist in maintaining their balance on the platform. Instructing the person to stand on the angled surface may comprise instructing the person to balance themselves on a blade of an ice skate on the angled surface.

The method may further comprise at least one of: instructing the person to shift their body weight to a left edge of the blade or a right edge of the blade based on the first angle, and instructing the person to shift their body weight forward or backward based on the second angle. The method may further comprise instructing the person to align the blade with a at least one of a structure and an indicia associated with the angled surface. The method may further comprise instructing the person to adjust one of the first angle and the second angle by inserting a wedge under the platform.

In accordance with a second aspect of the invention, there is an ice-skating training system comprising a platform and a base supporting the platform. The platform comprises: a first substantially planar surface that is arranged at a first angle relative to horizontal and at a second angle relative to the horizontal; a second substantially planar surface that is arranged at the first angle relative to horizontal and at the second angle relative to the horizontal; and a third substantially planar surface arranged between the first surface and the second surface and arranged at the second angle relative to the horizontal. The system includes at least one of a structure and an indicia arranged in the base that indicates proper alignment of a skate blade in relation to the first or second surface. The system includes a rubber-like material arranged on the first, second, and third surfaces.

In embodiments, the first angle and the second angle are greater than 0°. The first angle is configured to cause a user standing on the at least one substantially planar surface of the ice-skating training system to shift their weight to a predetermined portion of a skate blade. The second angle comprises a pitch associated with a length of the platform and is configured to cause a user standing on the platform to shift their weight forward or backward.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 3:
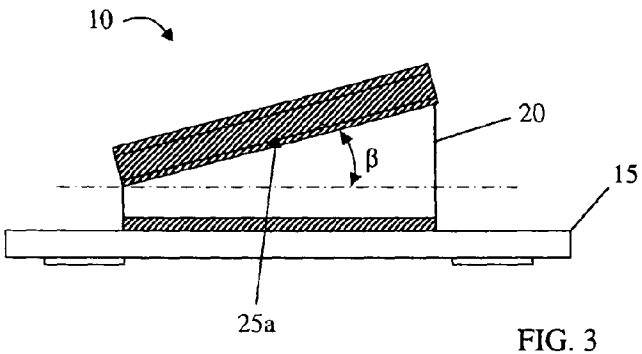
FIG. 3 shows a side view of the off-ice edge trainer of FIG. 1 viewed along arrow III.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention relates generally to a training apparatus and method, and more specifically to an off-ice training aid for skaters that is configured to strengthen the appropriate musculature and balance aspects associated with skating edge techniques. Embodiments of the invention include a platform having angled surfaces that are configured to mimic on-ice skating conditions when a user balances on the platform while wearing ice skates. More specifically, the platform includes angled surfaces that distribute a user's weight onto either the inside edge or outside edge of the user's skate. In embodiments, the platform also includes a pitch that distributes a user's weight to mimic skating in either the forward or backward direction. In this manner, implementations of the invention can be used to approximate actual on-ice skating conditions while training in an off-ice environment (e.g., while not skating on the ice).

Embodiments of the invention can be used to approximate at least eight on-ice edge conditions, including: right forward inside (RFI); right back inside (RBI); right forward outside (RFO); right back outside (RBO); left forward inside (LFI); left back inside (LBI); left forward outside (LFO); and left back outside (LBO). Additional embodiments include at least one stability pole that may be employed by a user to help maintain their balance while standing on or using the platform. Further embodiments include at least one wedge-shaped insert that can be used to modify the angles of the surfaces of the platform. Particular embodiments include one or more stability poles which the user can employ to maintain their balance on the platform. The stability poles enable a user to gradually build strength while practicing on-edge movement principles in the off-ice environment.

On-ice skating maneuvers are a product of strength and balance working with the natural forces of physics. Forces such as centripetal force (e.g., the force that pulls a skater into their edge) and centrifugal force (e.g., the force that a skater fights against to maintain his or her balance) take place when there is movement, and as such have not been practical to accurately mimic in off-ice training techniques. However, in accordance with aspects of the invention, the strength and balance associated with these forces during skating can be accurately re-created in an off-ice environment when the skating edge is accurately produced from the ground-up.

Implementations of the invention are configured to be used in an off-ice environment while the user is wearing at least one ice skate. In embodiments, the platform is sized and shaped such that when a user stands on an angled surface of the platform in his or her skate, the user is required to shift their weight to a particular portion of the skate edge in order to maintain their balance. By performing exercises while balancing in this manner, the user activates groups of muscles that are used in actual on-ice skating conditions (e.g., jump entry, glide, stroke, spiral, check out, etc.). In this manner, implementations of the invention permit a user to approximate actual skating techniques while training in the comfort of an off-ice environment.

In embodiments, the platform is structured and arranged to mimic the on-ice sensation of skating on an edge. For example, surfaces of the platform may be arranged at a pitch that mimics the force that momentum creates when a person is in motion on-ice. Like momentum, the pitch is designed to shift the user's body weight forward when the user stands on the platform in a forward-skating direction and backward when the user stands on the platform in a backward-skating direction. To compensate for the pitch and maintain his or her balance, a user may be instructed to shift their weight against the pitch, just as they would have to shift their weight actively against the force associated with momentum on the ice. In this manner, implementations of the invention reproduce what it feels like to be on an edge while in motion. The instructions may be provided, for example, by way of: indicia on the platform, instructional audio and/or video, and instructional printed matter (e.g., pamphlet, manual, etc.), etc.

Proper edge techniques require muscles in the entire body to work concurrently. Muscles associated with the ankles, knees, pelvic girdle and core stabilizers are particularly significant in skating. In implementations, the off-ice edge trainer is configured, via selectively angled surfaces, to activate these muscles at the same time.

The muscles located in the pelvis are of particular significance in skating as these muscles are responsible for pelvic stabilization and maintaining a skater's center of gravity during edge techniques. The pelvic muscles include both the hip extensors and abductors of the thigh. While hip extensors can be activated with generic motions such as resisted hip extension off-ice, the abductors that are applicable to on-ice edge maneuvers are more difficult to train off-ice. Moreover, training these muscles separately is not as effective as training them at the same time. Even though bodies are able to remember how muscles contract (e.g., muscle memory), when a user trains off-ice generically with pure motions such as hip extension or pure (i.e., isolated) hip abduction, the muscles do not learn how to effectively work together in the way that they do on the ice. Therefore, training generically with single (i.e., isolated) motions does not result in the best possible strength gains on the ice.

On-ice edging requires the hip extensors and abductors to work together at the same time. Since the two muscles work together during a maneuver on the ice, it is advantageous to train them in the same fashion off the ice in order for there to be carry over onto the ice. Empirical evidence (i.e., electromyography (EMG) study) verifies that embodiments of the invention cause a user to concurrently activate their hip abductors and hip extensors.

Embodiments provide the user with more than generic strength and/or balance benefits, since training off-Ice while wearing skates creates a situation that is very similar to actually skating on the ice. Accordingly, neuromuscular gains (e.g., muscle memory, coordination, etc.) made using the off-ice edge trainer of the present invention can be immediately used once the skater returns to the ice. This type of sport-specific conditioning represents an advantage provided by embodiments of the invention.

By facilitating training in a static off-ice environment, implementations of the invention eliminate forces of physics associated with movement on-ice. In this manner, a skater is provided the opportunity to focus directly on principles that are seen in ballet such as isolation, awareness, concentration, control, alignment and centering. Accordingly, embodiments enable the user to strengthen the mind-body connection (e.g., coordination, muscle memory, proprioception, etc.).

Figure skating, like ballet, has a foundation that is built on proper body alignment and the person's ability to 'center' correctly. Proper centering and alignment are significant factors in the fluidity of movement and the ability to perform technical maneuvers such as spirals and jumps. A person's center of gravity in off-ice situations may be dramatically different than their center of gravity when they are skating on-ice. For example, during an on-ice turning maneuver in which pressure is exerted on the outside edge of the skate on the left foot, the skater's center of gravity generally moves toward a center of the turn (e.g., to the left of the skater). Changes in the center of gravity result in differences in contraction patterns of stabilizing musculature, proprioception (e.g., knowing where your body is in space) and total body coordination. Implementations of the invention enable a user to practice using the appropriate musculature to handle such centering changes in a safe off-ice environment prior to attempting technical maneuvers on the ice where injury may occur.

Jumps are a popular aspect of figure skating, and maintaining proper edge pressure is a significant factor in executing jumps. The ability to perform multi-revolution jumps is related to a skater's lower extremity strength. Typical squatting motions and other generic plyometric exercises do not activate a person's pelvic stabilizers in a way that approximates actual skating associated with jumps. However, by mimicking the forces that a skater feels on the skate edge when skating, embodiments of the invention enable a skater to train for jump entries as well as landings. Additionally, by approximating the edge forces associated with actual skating, embodiments of the invention enable a user to concurrently strengthen extremity musculature and core stabilizers that are used during jumps.

Studies have shown that a decrease in the moment of inertia prior to take off and a decrease in the skater's forward speed by virtue of enhanced skid patterns were consistent findings in skaters that successfully performed multi-revolution jumps. It has further been shown that skaters typically increase their number of revolutions more effectively by increasing their rotational velocity rather than by increasing their air time. For example, skaters who successfully achieve a triple axel have a rotational velocity that is on average 70% faster than their rotational velocity during a single axel. Also, skaters who successfully complete a triple axel generally travel horizontally only about 70% as far as they do during a single axel. Such studies suggest that the slower a figure skater moves, the more potential he or she has in generating ground reaction forces through their skate into the ice. Conversely, if a skater goes into a jump entry with too much speed, they lose the potential of fully pressing down into the ground prior to take off.

In figure skaters, jumping energy is transferred from the ground into their hips, which then makes the rotation of the hips and trunk more powerful. The chain of events may occurs as follows. First the more force that is applied into the ground at a given point in time, the more potential there is for an equal and opposite force to move up through the foot, knee and into the hips and trunk. Second, because the hips and trunk are going to rotate, more force applied to the ground supplies this rotation with more force. Therefore, as the forces increase into the hips and trunk, the velocity of rotation increases. Third, as the rotational velocity increases, so does the ability of the skater to achieve more rotation over a fixed rate of time in the air. Put another way, a skater that applies more force to the ground prior to and during takeoff has more energy to jump higher and/or complete more revolutions. Because embodiments of the invention enable a skater to train the muscles associated with jump takeoffs in a manner that mimics on-ice conditions, implementations of the invention provide an enhanced training tool for skaters.

Studies have shown that the two most common sources of injury associated with figure skating are in the lower back and the knees. Particularly, injuries to the lower back and knees account for 34% and 26% of injuries in the sport, respectively. Because embodiments of the invention assist a skater in training and developing muscles in a manner that mimics actual skating, implementations of the invention can be used to minimize and possibly avoid such injuries.

Exemplary Off-Ice Trainer

Figure 2:
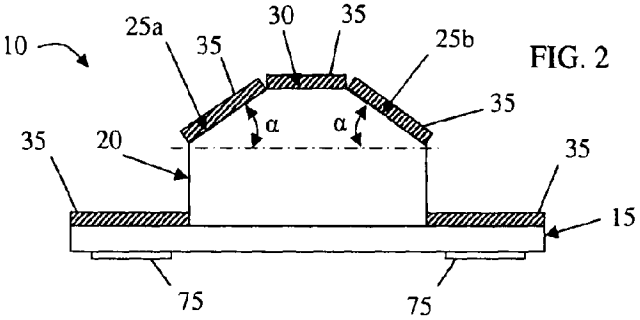
FIG. 2 shows a front view of the off-ice edge trainer of FIG. 1 viewed along arrow II.
Figure 1:
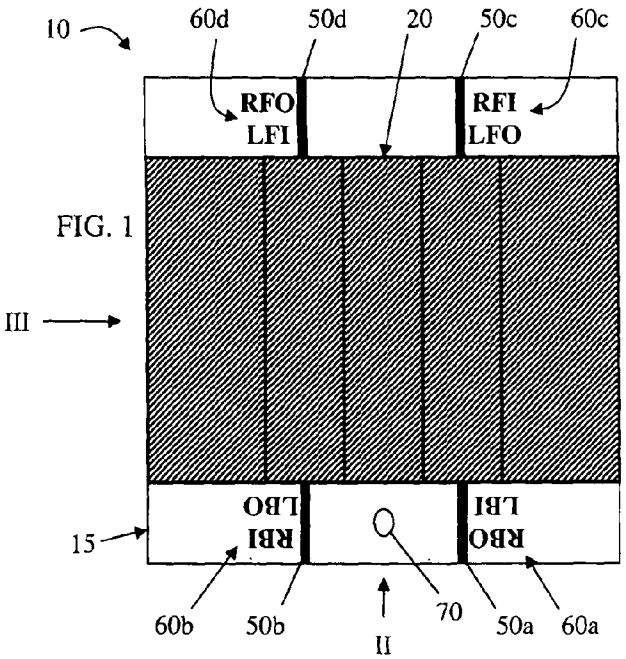
FIG. 1 shows a top view of an off-ice edge trainer in accordance with aspects of the invention.
Figure 4:
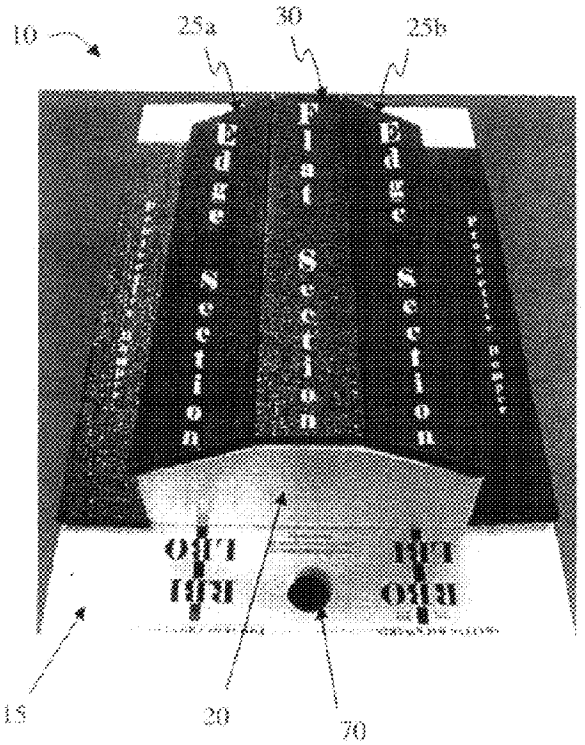
FIGS. 4 and 5 show perspective views of an exemplary off-ice edge trainer in accordance with aspects of the invention.
Figure 5:
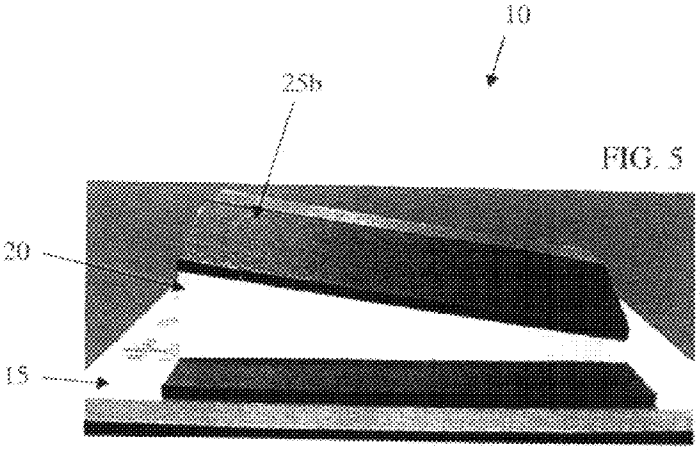

FIG. 1 shows a top view of an off-ice edge trainer 10 in accordance with aspects of the invention. FIG. 2 shows a front view of the off-ice edge trainer 10 viewed along arrow II, and FIG. 3 shows a side view of the off-ice edge trainer 10 viewed along arrow III. FIGS. 4 and 5 show perspective views of an exemplary off-Ice edge trainer 10. In embodiments the off-ice edge trainer includes a base 15 and a platform 20. The platform 20 includes two angled surfaces 25a, 25b and a central surface 30. The angled surfaces 25a, 25b are arranged at a first angle $\alpha$ relative to horizontal, and the flat surface 30 and both angled surfaces 25a, 25b are arranged at a second angle $\beta$ relative to horizontal. The second angle $\beta$ is also referred to as pitch. In accordance with aspects of the invention, the first and second angles $\alpha,\beta$ are configured to cause a user standing on one of the surfaces 25a or 25b to shift their weight to a particular portion of their skate blade to maintain their balance on the platform 20.

In embodiments, the first angle α is in the range of about 20° to about 30° and the second angle β is in the range of about 8° to about 10°. However, the invention is not limited to these values, and any suitable values may be used for the first angle α and second angle β. As the value of the first angle α and/or second angle β increases, it becomes more difficult for a user to maintain their balance on a skate blade while standing on one of the surfaces 25a, 25b. Accordingly, it is contemplated within the scope of the invention that different off-ice edge trainers 10 can be configured differently for different skill-level skaters by appropriately selecting one or both of the angles α and β. For example, different respective off-ice edge trainers 10 may be configured with a first angle α of about 20° for novice skaters, with a first angle α of about 25° for intermediate skaters, or with a first angle α of about 30° for advanced skaters. Additionally or alternatively, the first and second angles α,β of a single off-ice edge trainer 10 may be modified for different skill levels using an insert, as described in greater detail herein.

In implementations, the base 15 and platform 20 are composed of solid wood. However, the invention is not limited to this material, and the base 15 and platform 20 may be made of any suitable material having adequate strength and rigidity to support the weight of a user. For example, the base 15 and platform 20 may be composed of materials such as: plastic, rubber, metal, alloy, composite material, fiberboard, chipboard, plywood, etc. Moreover, the material of the base 15 may be the same as or different from the material of the platform 20. Additionally, the base 15 and platform 20 are not limited to solid materials, but rather at least one of the base 15 and platform 20 may be hollow. Also, the base 15 and platform 20 may be separate elements that are connected in any suitable manner, including but not limited to mechanical fasteners (e.g., screws, bolts, nails, staples, etc.), adhesive, double-sided tape, welding, etc. Alternatively, the base 15 and platform 20 may be integral, such as being formed as a single blow-molded plastic article.

According to aspects of the invention, one or more surfaces of the base 15 and/or platform 20 may be covered with a material 35. For example, as depicted in FIGS. 1 and 2, strips of material 35 are arranged on the angled surface 25a, 25b, the central surface 30, and on portions of the base 15. In embodiments, the material 35 is a rubber material or rubber-like material that does not dull a skate blade and has: (i) a sufficient coefficient of friction to prevent skate edge slippage when a user stands on the material 35, and (ii) sufficient rigidity that it does not appreciably deform when a user stands on the material 35. A particular implementation of the invention utilizes one-quarter inch thick ELEPHANT BARK (available from RUBBER-CAL, INC. of Santa Ana, Calif.) as the material 35. However, the invention is not limited to this particular material, and any suitable material may be used for material 35.

In embodiments, individual strips of material 35 are connected by double-sided tape on each respective surface. However, the invention is not limited to this implementation, and a single piece of material 35 may be sized and shaped to coat one or more surfaces. For example, a coating may be sprayed onto plural surfaces of the base 15 and/or platform 20 and allowed to cure to form a unitary shell of material 35. Alternatively, a prefabricated mold of material 35 that conforms to plural surfaces may be used. Other variants are contemplated within the scope of the invention.

In embodiments, the base 15 is a square plate having a length of about 16.5 inches, a width of about 11 inches, and a thickness of about ½ inch. In embodiments, the platform 20 has a length of about 12 inches and a width of about 7 inches, and is centered on the base 15 with portions of the base 15 extending out from a perimeter of the platform 20. In embodiments, the angled surfaces 25a and 25b are substantially planar and have a width of about 2.5 inches and a length substantially equal to the length of the platform 20. In embodiments, the central surface 30 is substantially planar and has a width of about 2 inches and a length substantially equal to the length of the platform 20. In embodiments, a first end of the central surface 30 is arranged about 2.75 inches above an upper surface of the base 15, while a second end of the central surface 30 is arranged about 1.5 inches above the upper surface of the base (e.g., due to the pitch angle β). Although a specific embodiment having specific dimensions is described herein, the invention is not limited to these dimensions. Instead, any suitable dimensions may be used for the base 15, platform 20, angled surface 25a, 25b, central surface 30, first angle α, and second angle β.

In embodiments, the base 15 includes structure and/or markings 50a-d that provide a user with a visual indication of where to align their skate blade when standing on one of the angled surfaces 25a, 25b. Moreover, the base 15 may be provided with indicia 60a-60d indicating what edge a user is exercising when the user is standing on one of the angled surfaces 25a, 25b, in either the forward or backward direction. Also, the base 15 may be provided with a hole 70 or other structure to assist a user in carrying the off-ice edge trainer 10. Additionally, one or more elements 75 may be provided on the bottom side of the base 15 (e.g., opposite the platform 20) to prevent slippage on and/or marring of a supporting surface (e.g., floor).

Figure 6:
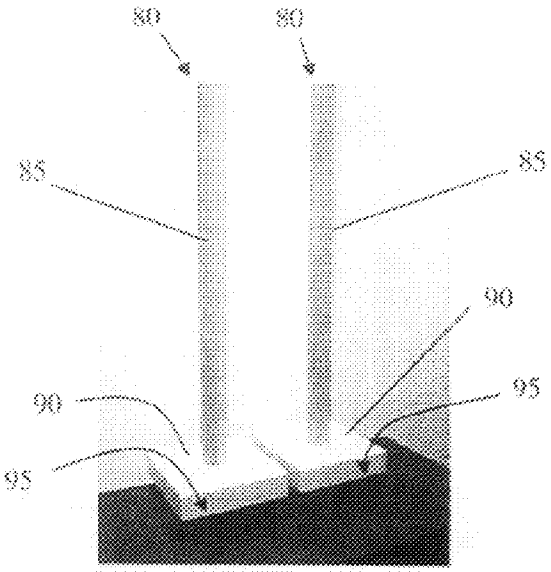
FIG. 6 shows stability poles usable with the off-ice edge trainer in accordance with aspects of the invention.

According to further aspects of the invention, the off-ice edge trainer 10 includes one or more stability poles 80 as depicted in FIG. 6. A user may employ the poles 80 to assist in maintaining his or her balance when standing on the platform 20. Each stability pole 80 may be made of any suitable material, including but not limited to wood, plastic, metal, composite, etc. The pole 80 may be any desired length, such as, for example, in a range of about four feet to about six feet long.

In embodiments, the pole 80 includes a shaft 85 connected to a pole base 90. The shaft 85 may be solid, hollow, telescopic, sectional, or any other desired configuration. The shaft 85 may be connected to the pole base 90 in any desired manner (e.g., mechanical fastener, press fit, adhesive, etc.) or may be integral with the pole base 90.

In further embodiments, the pole base 90 has a rounded (e.g., spherical, hemispherical, curved, convex, etc.) bottom surface 95. A rounded bottom surface 95 permits a user to easily change the angle of the shaft 80 while still maintaining the pole 80 in contact with the floor. However, the invention is not limited to a pole base 90 having a rounded bottom surface 95. Instead, the bottom surface 95 may be any desired shape, including flat.

Figure 7A:
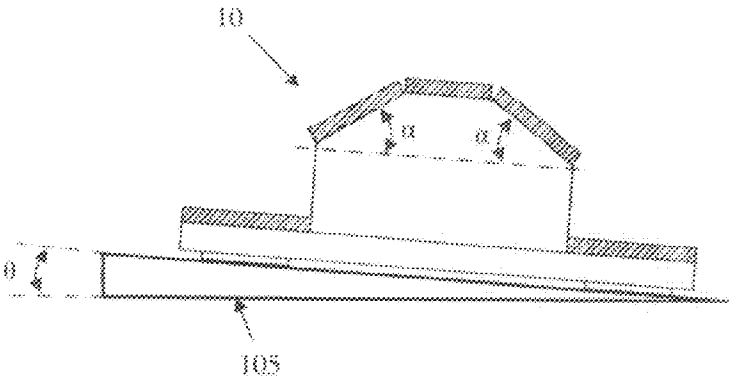
FIGS. 7A and 7B show an insert in accordance with aspects of the invention.
Figure 7B:
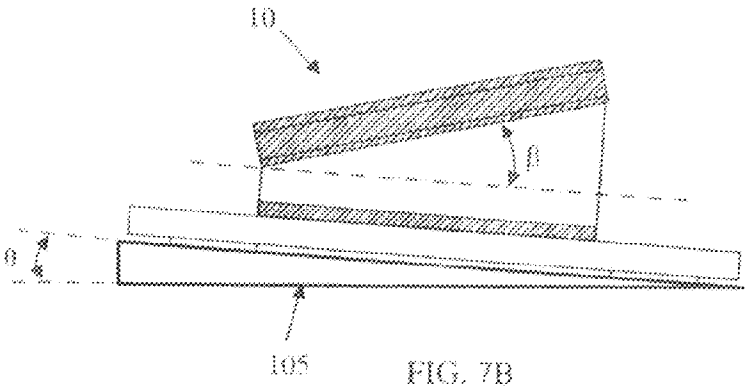
Figure 8:
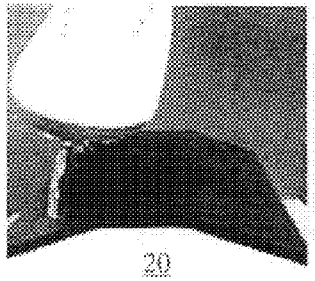
FIGS. 8-15 demonstrate a method of using the off-ice edge trainer in accordance with aspects of the invention.
Figure 9:
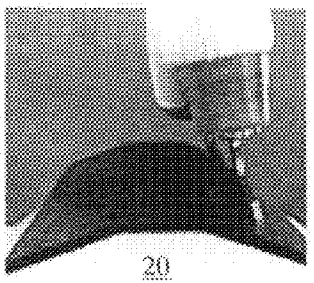
Figure 10:
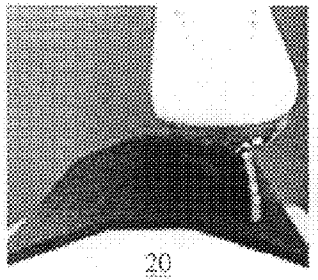
Figure 11:
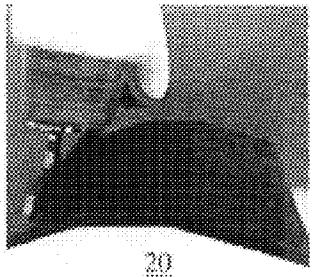
Figure 12:
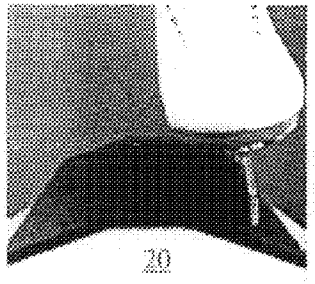
Figure 13:
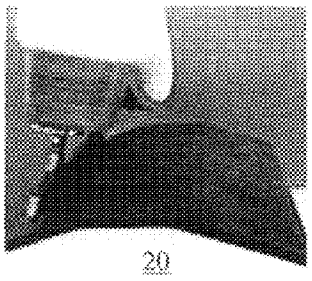
Figure 14:
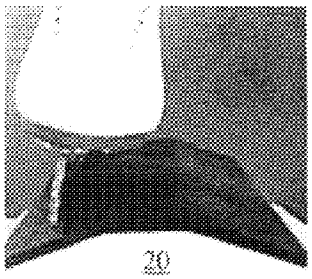
Figure 15:
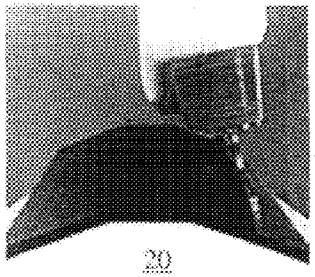

FIGS. 7A and 7B show an optional insert 105 that can be used with the off-ice edge trainer 10 to alter the first angle α or the second angle β. The insert 105 comprises a wedge of material that is configured to be placed between the base 15 and the supporting structure (e.g., floor). The wedge of the insert 105 has an angle θ that adds to or subtracts from the first angle α or the second angle β when the insert is placed beneath the base 15.

For example, consider the case of an off-ice edge trainer 10 having a first angle α of 20° and a second angle β of 8° and an insert 105 having an angle θ of 1°. By appropriately placing the insert 105 under the base 15, the angle of a first one of the angled surfaces (e.g., 25a) can be increased by one degree to 21° while the angle of the other one of the angled surfaces (e.g., 25b) is decreased by one degree to 19°. Alternatively, by appropriately placing the insert 105 under the off-ice edge trainer 10 in relation to the pitch angle β, the pitch angle can be incremented or decremented by the angle θ of the insert 105.

The insert 105 is described as having an angle θ of about 1°; however, the invention is not limited to this value, and any suitable value may be provided for angle θ. Additionally, a plurality of inserts 105 may be used together to modify the first angle α or second angle β by the cumulative sum of the angle θ associated with each one of the respective plurality of inserts 105. Additionally or alternatively, an adjustable insert 105 may be provided in which the angle θ is adjustable (e.g., mechanically and/or pneumatically). The insert 105 may be built into the base 15 (e.g., integral with or mechanically connected to the base) or alternatively may be an additional piece that slides under the base 15 to change the appropriate angle according to a user's desired level of difficulty. The elements 75 may be used to provide sufficient friction between the base 15 and the insert 105 so that the base 15 does not slide off of the insert 105 when in use. Additionally or alternatively, a selective locking mechanism may be used to connect the base 15 to the insert 105 and prevent relative motion between the base 15 and the insert 105.

In a particular embodiment, a plurality of inserts 105 or an adjustable insert 105 is usable to modify the first angle α or second angle β between 1° and 20° in one-degree increments. In this manner, the first angle α may be adjusted to any desired angle between 1° and 40° in single degree increments. Accordingly, a single off-ice edge trainer 10 can be used by skaters of all skill levels by appropriately adjusting the first angle α or second angle β with the at least one insert 105.

Exemplary Methods of Use

In embodiments, a user utilizes the off-ice edge trainer 10 by performing strength and/or balance exercises while standing on various surfaces of the off-ice edge trainer 10 in his or her ice skates. When a user stands on one of the angled surfaces 25a or 25b, the first angle α associated with the angled surface creates an outside edge or an inside edge by simulating the reaction a skater would experience when trying to counteract centripetal force that is experienced during motion on the ice. Also, the pitch angle β is designed to replicate the natural forces of momentum on the ice. By shifting his or her weight against the pitch angle β, the user is forced to utilize their resources for balance and weight shifting as they would on the ice while counteracting the force of momentum.

Edges are classified as an inside edge or outside edge. Edges are further sub-categorized into inside forward, inside backward, outside forward and outside backward. In total, there are four potential edge combinations for each foot, making up a total of eight different possibilities for edging. The eight possible edges are shown in FIGS. 8-15. The platform 20 of the off-ice edge trainer 10 permits a user to stand in one of these eight edge combinations due to the first angle α of the angled surfaces 25a and 25b, the pitch angle β, and the ability of the user to stand on the device facing in either direction (e.g., forward or backward). Also, by standing on the flat surface 30 instead of one of the angled surfaces 25a, 25b, the user may train without employing a side edge (e.g., left or right) but while still counteracting simulated momentum forces in the forward or backward direction.

In an exemplary method of using the off-ice edge trainer 10, a users stands on one of the angled surfaces 25a or 25b with their skate. More specifically, the user aligns his or her skate blade with a black line (e.g., marker 50a-d) of the label (e.g., indicia 60a-d) of the desired edge (e.g., RBO, LBI, RBI, LBO, RFO, LFI, RFI, LFO). While standing in the off-ice edge trainer 10 in this manner, the user moves other parts of their body to train for various on-ice maneuvers including, but not limited to: free skate backward, free skate forward, basic stroking, glide, basic spiral, advanced spirals, cross over, sit spin, axel entry, flip entry, loop entry, lutz entry, and landings. Although a user normally stands on a single leg while using the off-ice edge trainer 10, the user preferably wears both skates in order to make the training exercises sport-specific to figure skating. While performing the training maneuvers on the off-ice edge trainer 10, the user may employ one or both stabilizing poles 80 to assist in retaining their balance. Also, while performing the training maneuvers on the off-ice edge trainer 10, the user may at least one of: view themselves in a mirror (e.g., to gain instant visual feedback), view an instructional video (e.g., to see demonstration of proper techniques), and receive instruction from a coach or other trainer.

In embodiments, a method of training and/or exercising includes instructing a user to perform at least one of the steps described herein. For example, a method in accordance with aspects of the invention may include at any combination of: instructing a person to stand on an angled surface (e.g., surface 25a or 25b) of platform (e.g., of an off-ice edge trainer 10); instructing the person to move at least one body part while maintaining their balance on the angled surface; instructing the person to view themselves in a mirror while they move the at least one body part; instructing the person to grasp at least one stability pole to assist in maintaining their balance on the platform; instructing the person to balance themselves on a blade of an ice skate on the angled surface; instructing the person to shift their body weight to a left edge of the blade or a right edge of the blade based on the first angle; instructing the person to shift their body weight forward or backward based on the second angle (e.g., against the pitch); instructing the person to align the blade with a at least one of a structure and an indicia associated with the angled surface; and adjusting one of the first angle and the second angle by inserting a wedge under the platform.

The entry to many jumps occurs off an edge. Not only is a skater required to hold an edge going into a jump, but he or she is also asked to explode off the edge in order to create projectile motion. This type of explosion requires intense contraction of the pelvic stabilizing muscles, and it is this contraction that helps create the vertical component of the projectile motion. Essentially, just prior to take off, the explosion off the edge is more similar to a static explosion vs. a static hold, i.e. "holding onto the edge" as seen during spiral techniques and typical beginner edging exercises. In an exemplary method of training, the off-ice edge trainer 10 permits a user to train for entry strengthening off of an edge by moving up and down in the entry position while standing on the off-ice edge trainer 10.

In accordance with aspects of the invention, the user stands on the off-ice edge trainer 10 and does not move off the off-ice edge trainer 10 during an exercise (e.g., the skate remains in contact with the off-ice edge trainer 10). The off-ice edge trainer 10 is static in the sense that it is unlike other dynamic balance equipment that has a surface that creates variability under the foot based on weight distribution (e.g., a wobble board, half foam rolls, air filled devices, etc.). Also, because a user stands on the off-ice edge trainer 10 in their ice skate, the off-ice edge trainer 10 is different from conventional training systems that are used for postural control while seated.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An ice-skating training system, comprising:

a platform comprising a first surface and substantially planar surfaces which slope downward as the substantially planar surfaces extend away from the first surface on opposing sides of the first surface, and which are arranged at a first angle relative to horizontal, wherein the first angle is greater than 0°, and the first angle is configured to cause a user standing on the substantially planar surfaces of the ice-skating training system to shift their weight to a predetermined portion of a skate blade, and the substantially planar surfaces and the first surface are arranged at a second angle relative to horizontal which comprises a pitch associated with a length of the platform.

2. The system of claim 1, wherein the second angle is different from the first angle.

3. The system of claim 1, wherein the substantially planar surfaces comprise a first substantially planar surface and a second substantially planar surface.

4. The system of claim 3, wherein the first and second substantially planar surfaces are arranged on opposite lateral sides of the platform.

5. The system of claim 4, wherein the first surface is centrally located between the first and second substantially planar surfaces.

6. The system of claim 5, wherein the first surface is substantially planar and is arranged at a second angle relative to the horizontal.

7. The system of claim 6, further comprising a material which prevents slippage of the skate blade arranged on at least one of the two angled surfaces and the first surface.

8. The system of claim 1, further comprising at least one stability pole that a user grasps to assist in maintaining their balance while standing on the platform.

9. The system of claim 1, further comprising at least one insert placed under the platform to modify one of the first angle and the second angle.

10. An ice-skating training system, comprising:

a platform comprising a first surface and substantially planar surfaces which slope downward as the substantially planar surfaces extend away from the first surface on opposing sides of the first surface, and which are arranged at a first angle relative to horizontal, wherein the first angle is greater than 0°, the first angle is configured to cause a user standing on the at least one substantially planar surface of the ice-skating training system to shift their weight to a predetermined portion of a skate blade; and further comprising at least one of a structure and an indicia arranged in a base supporting the platform that indicates proper alignment of a skate blade in relation to the at least one angled surface.

11. The system of claim 1, wherein the second angle comprises a pitch associated with a length of the platform and is configured to cause a user standing on the platform to shift their weight forward or backward.

12. The system of claim 1, wherein the first angle and the second angle are configured to cause a user standing on the substantially planar surfaces to shift their weight to an edge position selected from one of:

right forward inside (RFI);
right back inside (RBI);
right forward outside (RFO);
right back outside (RBO);
left forward inside (LFI);
left back inside (LBI);
left forward outside (LFO); and
left back outside (LBO).

13. An ice-skating training system, comprising:

a platform comprising three substantially planar surfaces, the three substantially planar surfaces comprising:

a first substantially planar surface that is arranged at a first angle relative to horizontal and at a second angle relative to the horizontal;

a second substantially planar surface that is arranged at the first angle relative to horizontal and at the second angle relative to the horizontal;

a third substantially planar surface arranged between the first surface and the second surface and arranged at the second angle relative to the horizontal;

a base supporting the platform;

at least one of a structure and an indicia arranged on the base that indicates proper alignment of a skate blade in relation to one of the first surface and the second surface; and a material which prevents slippage of the skate blade arranged on the first, second, and third surfaces;

wherein the first angle and the second angle are greater than 0°, the first angle comprises a pitch associated with a width of the first substantially planar surface and the second substantially planar surface and which is configured to cause a user standing one of the first surface and the second surface of the ice-skating training system to shift their weight to a predetermined edge of a skate blade, and the second angle comprises a pitch associated with a length of the platform and is configured to cause the user standing on the platform to shift their weight forward or backward.

*14. A training system, comprising:*

*a platform comprising a first surface and substantially planar surfaces which slope downward as the substantially planar surfaces extend away from the first surface on opposing sides of the first surface, and which are arranged at a first angle relative to horizontal,*

*wherein the first angle is greater than 0°, and*

*the substantially planar surfaces and the first surface are arranged at a second angle relative to horizontal which comprises a pitch associated with a length of the platform.*

*15. The system of claim 14, wherein the second angle is different from the first angle.*

*16. The system of claim 14, wherein the substantially planar surfaces comprise a first substantially planar surface and a second substantially planar surface.*

*17. The system of claim 16, wherein the first and second substantially planar surfaces are arranged on opposite lateral sides of the platform.*

*18. The system of claim 17, wherein the first surface is centrally located between the first and second substantially planar surfaces.*

*19. The system of claim 18, wherein the first surface is substantially planar and is arranged at a second angle relative to the horizontal.*

*20. The system of claim 14, wherein the second angle comprises the pitch associated with a length of the platform and is configured to cause a user standing on the platform to shift their weight forward or backward.*

*21. The system of claim 14, wherein:*

*the first angle and the second angle are greater than 0°;*

*the first angle comprises a pitch associated with a width of the first substantially planar surface and the second substantially planar surface and which is configured to cause a user standing over one of the first surface and the second surface of the training system to shift their weight; and*

*the second angle comprises the pitch associated with the length of the platform and is configured to cause the user standing on the platform to shift their weight forward or backward.*

*22. The system of claim 14, wherein the first angle is configured to cause a user standing over the substantially planar surfaces of the training system to shift their weight.*

*23. A training system, comprising:*

*a first substantially planar surface that is arranged at a first angle relative to horizontal and at a second angle relative to the horizontal;*

*a second substantially planar surface that is arranged at the first angle relative to horizontal and at the second angle relative to the horizontal; and*

*a third substantially planar surface arranged between the first surface and the second surface and arranged at the second angle relative to the horizontal;*

*wherein the first angle and the second angle are greater than 0°,*

*the second angle comprises a pitch associated with a length of the platform, and*

*the first angle is such that the first substantially planar surface and the second substantially planar surface slope downward on opposing sides of the third substantially planar surface as they extend away from the third substantially planar surface.*

* * * * *